United States Patent
Baisley (10) Patent No.: US 7,613,666 B1
(45) Date of Patent: Nov. 3, 2009

(54) GENERATING A CLASS MODEL FROM A BUSINESS VOCABULARY TO REPRESENT FACTS EXPRESSIBLE IN THE BUSINESS VOCABULARY

(75) Inventor: Donald Edward Baisley, Laguna Hills, CA (US)

(73) Assignee: Microsoft Corporation, Redmond, WA (US)

( * ) Notice: Subject to any disclaimer, the term of this patent is extended or adjusted under 35 U.S.C. 154(b) by 702 days.

(21) Appl. No.: 10/831,679

(22) Filed: Apr. 23, 2004

(51) Int. Cl.
*G06G 7/00* (2006.01)
*G06E 3/00* (2006.01)

(52) U.S. Cl. .................. 706/20; 707/102; 707/206; 717/110

(58) Field of Classification Search .................. 706/20; 707/102, 206; 717/110
See application file for complete search history.

(56) References Cited

U.S. PATENT DOCUMENTS

| | | | |
|---|---|---|---|
| 4,974,191 A | 11/1990 | Amirghodsi | |
| 5,167,009 A | 11/1992 | Skeirik | |
| 5,197,005 A | 3/1993 | Shwartz | |
| 5,748,974 A | 5/1998 | Johnson | |
| 5,907,840 A | 5/1999 | Evans | |
| 6,023,669 A | 2/2000 | Suda | |
| 6,173,441 B1 | 1/2001 | Klein | |
| 6,523,172 B1 | 2/2003 | Martinez-Guerra | |
| 6,587,849 B1 | 7/2003 | Mason | |
| 6,640,207 B2 | 10/2003 | Witschel | |
| 6,754,321 B1 * | 6/2004 | Innes et al. | 379/201.03 |
| 6,763,341 B2 | 7/2004 | Okude | |
| 6,789,252 B1 | 9/2004 | Burke | |
| 7,020,869 B2 | 3/2006 | Abrari | |
| 7,185,016 B1 | 2/2007 | Rasmussen | |
| 7,233,915 B2 | 6/2007 | Metcalfe | |
| 7,356,522 B2 | 4/2008 | Herrera | |
| 2002/0107889 A1 | 8/2002 | Stone | |
| 2003/0097363 A1 | 5/2003 | Dorsey | |
| 2003/0216919 A1 | 11/2003 | Roushar | |
| 2004/0030421 A1 * | 2/2004 | Haley | 700/49 |
| 2004/0210445 A1 | 10/2004 | Veronese | |
| 2005/0096908 A1 | 5/2005 | Bacchiani | |
| 2005/0108001 A1 | 5/2005 | Aarskog | |
| 2005/0246157 A1 | 11/2005 | Baisley | |

(Continued)

OTHER PUBLICATIONS

Bryant et al., From Natural Language Requirements to Executable Models of Software Components, Sep. 24, 2003, 8 pages.

(Continued)

*Primary Examiner*—David R Vincent
*Assistant Examiner*—Kalpana Bharadwaj
(74) *Attorney, Agent, or Firm*—Workman Nydegger (57) ABSTRACT

An embodiment of the present invention is a method for generating an object-oriented model from a vocabulary, the vocabulary comprising terms and sentential forms, each of the terms representing a concept, each of the sentential forms representing a fact type and including at least one placeholder, the placeholder being specified by a term. For each of the terms in the vocabulary, a class is created. Each instance of the created class represents a fact that a thing is classified to be an instance of the concept represented by the corresponding term. For each sentential form in the vocabulary, a class is created. Each instance of the created class represents a fact that is an instance of the fact type represented by the corresponding sentential form.

30 Claims, 8 Drawing Sheets

U.S. PATENT DOCUMENTS

| | | |
|---|---|---|
| 2005/0246371 A1 | 11/2005 | Baisley |
| 2005/0289560 A1 | 12/2005 | Sedogbo |
| 2006/0025987 A1 | 2/2006 | Baisley |
| 2006/0026576 A1 | 2/2006 | Baisley |

OTHER PUBLICATIONS

Donald Baisley and Peter Cunningham, Business Transformation Utilizing Business Rule Technologies, Dec. 2, 2003, 18 pages.
L. Mich et al, NL-OOPs: A Requirements Analysis Tool Based on Natural Language Processing, 2002, 11 pages.
Perex-Gonzales et al. "GOOAL: A Graphic Object Oriented Analysis Laboratory" Nov. 2002, AMC OOPSLA '02, pp. 38-39.
Evans "A Comparison of Tule-Based and Machine Learning Methods for Identifying Non-Normal It", 2000, NPL 2000, LNCS 1835, pp. 233-240.
Office Action dated Dec. 6, 2007 cited in related U.S. Appl. No. 10/860,672 (Copy Attached).
Office Action dated Dec. 12, 2007 cited in related U.S. Appl. No. 10/837,299 (Copy Attached).
Office Action dated Oct. 19, 2007 cited in related U.S. Appl. No. 10/899,891 (Copy Attached).
Office Action dated Jun. 27, 2008 cited in related U.S. Appl. No. 10/899,891 (Copy Attached).
Office Action dated Oct. 3, 2008 cited in U.S. Appl. No. 10/837,299 (Copy Attached).
Office Action dated Nov. 28, 2007 cited in U.S. Appl. No. 10/908,452 (Copy Attached).
Notice of Allowance dated Oct. 28, 2008 cited in U.S. Appl. No. 10/860,672 (Copy Attached).
Office Action dated Nov. 14, 2008 cited in U.S. Appl. No. 10/903,452 (Copy Attached).
Halpin, "Object Role Modeling: An Overview", Microsoft White Paper, Nov. 2001, Available at: http://msdn.microsoft.com/en-us/library/aa290383.aspx.
Office Action dated Jan. 7, 2009 cited in U.S. Appl. No. 10/899,891 (Copy Attached).
Notice of Allowance dated Apr. 3, 2009 cited in U.S. Appl. No. 10/837,299 (Copy Attached).

* cited by examiner

GENERATING A CLASS MODEL FROM A BUSINESS VOCABULARY TO REPRESENT FACTS EXPRESSIBLE IN THE BUSINESS VOCABULARY

BACKGROUND

1. Field of the Invention

Embodiments of the present invention relate to methods and modeling tools for generating object-oriented class models from business vocabularies, and more specifically to a method and a modeling tool for generating class models that can be used with the Meta Object Facility and XMI Metadata Interchange.

2. Description of Related Art

Business vocabularies are created in order to formalize definitions of words used in business policies, rules and statements. When business systems are automated, there is a need to communicate business facts electronically and to record facts in repositories where repository services such as versioning can be used.

The Meta Object Facility (MOF) specified by the Object Management Group (OMG) provides repository services for objects defined using class models. XML Metadata Interchange (XMI) specified by OMG further provides a means of serializing MOF objects using XML (extended Markeup Language).

It is advantageous to have a technique that can generate class models usable with MOF and XMI from business vocabularies in order to support automated business communication and documentation. Other approaches to building class models from vocabularies have been aimed at creating purpose-based class models suitable for business simulation, but unfit for business communication because they encapsulate information structure at a granularity larger than a single business fact. Also, these approaches tend to be largely manual and manual transformation is usually error-prone. A technique for automatic generation will save time and avoid errors of manual transformation.

SUMMARY OF THE INVENTION

An embodiment of the present invention is a method for generating an object-oriented model from a vocabulary, the vocabulary comprising terms and sentential forms, each of the terms representing a concept, each of the sentential forms representing a fact type and including at least one placeholder, the placeholder being specified by a term. For each of the terms in the vocabulary, a class is created. Each instance of the created class represents a fact that a thing is classified to be an instance of the concept represented by the corresponding term. For each sentential form in the vocabulary, a class is created. Each instance of the created class represents a fact that is an instance of the fact type represented by the corresponding sentential form.

BRIEF DESCRIPTION OF THE DRAWINGS

The invention may be best understood by referring to the following description and accompanying drawings that are used to illustrate embodiments of the invention. In the drawings.

DESCRIPTION

An embodiment of the present invention is a method for generating an object-oriented model from a vocabulary, the vocabulary comprising terms and sentential forms, each of the terms representing a concept, each of the sentential forms representing a fact type and including at least one placeholder, the placeholder being specified by a term. For each of the terms in the vocabulary, a class is created. Each instance of the created class represents a fact that a thing is classified to be an instance of the concept represented by the corresponding term. For each sentential form in the vocabulary, a class is created. Each instance of the created class represents a fact that is an instance of the fact type represented by the corresponding sentential form.

The resulting object-oriented model can be used to define automated systems that represent facts expressible in the vocabulary.

The present invention helps to accelerate the availability of repository models. Availability is accelerated by generating the models directly from vocabularies defined by business people. Automatic generation can be performed much more quickly than creation of models by human analysts, and with consistency and fewer errors.

The present invention helps to accelerate the availability of XML schemas that define the format of XML serialization of facts expressible in a business vocabulary. The XML schemas are produced by creating class models that conform to the MOF specification.

It is important to note that the granularity of encapsulation of information in each object created using the method of the present invention is no larger than the representation of a single fact.

The present invention generates models from a business vocabulary expressed in business language even if the vocabulary is defined without mention of software or computer concepts.

The present invention is applicable to any natural language used in business. It is based on linguistic concepts that are found in all natural languages.

Applications of the method of the present invention in separate instances for the same vocabulary result in the same object-oriented model.

For ease of understanding and clarity, some of the terms that will be used hereinafter are defined as follows.

The Unified Modeling Language (UML) is a language used for defining models of software and information systems.

The following terms correspond to object-oriented concepts that are fundamental to UML and MOF. They are widely documented and understood by one skilled in the art.

In UML, a model is a package of model elements, such as classes and generalizations. A package is a namespace for model elements.

A class is a classifier whose instances are objects.

An object is an abstract representation of a thing. For example, a class called BankAccount can be a classifier of objects representing individual accounts in a banking system. Another class, Customer, can classify objects representing customers.

An attribute is a property defined for a classifier. It represents a slot that can hold a value for each instance of a class.

A generalization specifies that one classifier is a subclass of another. For example, a class Customer could be a subclass of another class Person. The meaning of the generalization in this case is that every Customer object is necessarily also a Person object.

The following terms correspond to concepts in a vocabulary.

A term is a word or phrase representing a concept. Many terms are common nouns.

Example: "vendor"

Example: "price"

A connecting symbol is a word or phrase such as a verb, preposition or sequence of these that is defined to represents a relation between things.

Example: "charges" in "vendor charges price"

Example: "charged by" in "price charged by vendor"

A symbolic form is a sequence of placeholders and connecting symbols such as verbs and prepositions that represents a use of the connecting symbols with a defined meaning.

Example: "vendor charges price"

Example: "price charged by vendor"

A placeholder is a term in a symbolic form representing a type of thing involved in the represented relation and its position with respect to the connecting symbols of the symbolic form. Note that placeholders are shown as underlined in the following examples.

Example: "vendor" and "price" in "vendor charges price"

Example: "price" and "vendor" in "price charged by vendor"

A sentential form is a symbolic form that can be used to construct a propositional statement, such as a statement of a fact.

Example: "vendor charges price"

A vocabulary is a set of defined symbols such as terms and connecting symbols.

A fact type is a classification of facts based on their being expressible in the same form. A sentential form is often used to represent a fact type. For example, "person owns pet" represents a fact type that is the classification of every fact that a particular person owns a particular pet. Note that the same facts can often be expressed in multiple forms. For example, "pet is owned by person" represents the same fact type as "person owns pet".

As is recommended for formal business vocabularies used in a Business Rules Approach to documenting business policy, verbs and prepositions are not defined independently but are defined with respect to the types of things they relate in symbolic forms.

In the following description, numerous specific details are set forth. However, it is understood that embodiments of the invention may be practiced without these specific details. In other instances, well-known circuits, structures, and techniques have not been shown in order not to obscure the understanding of this description.

Figure 1:
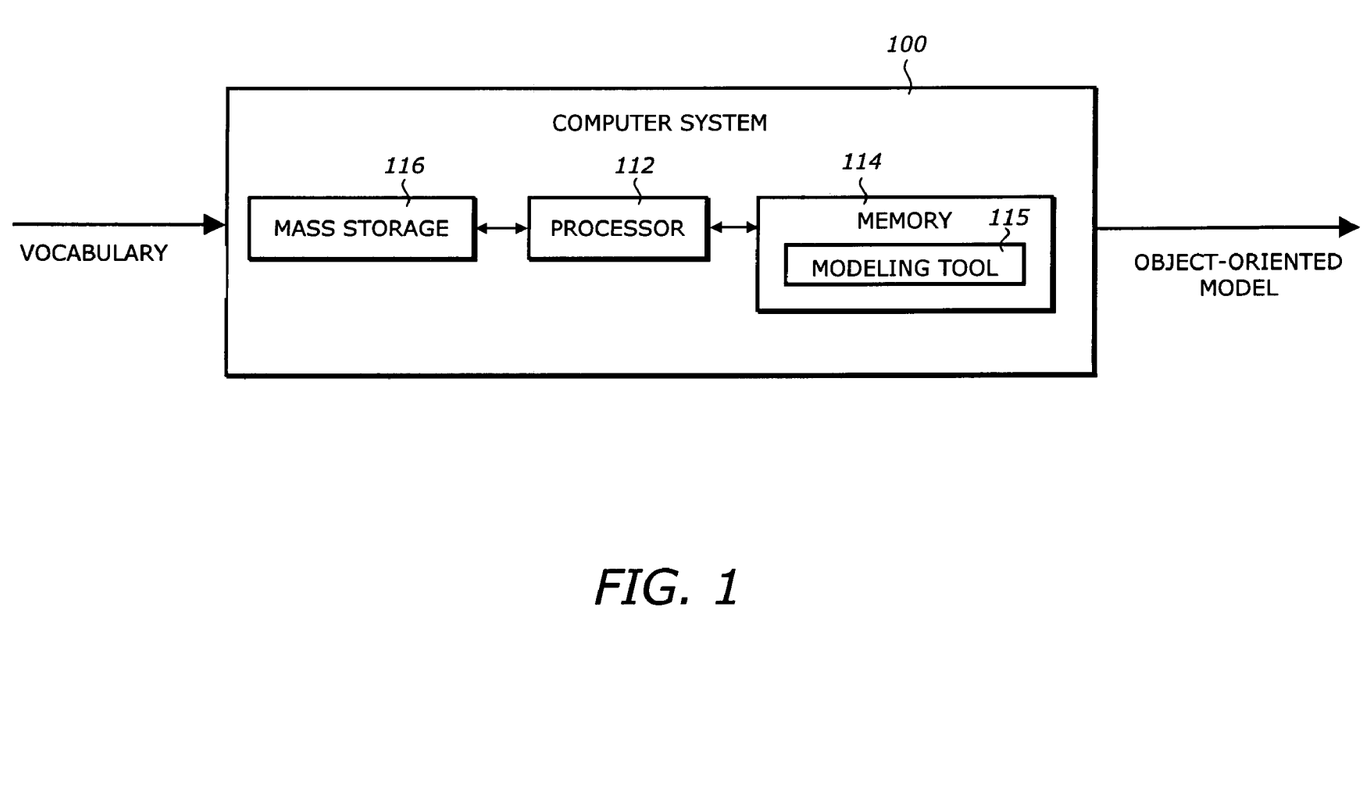
FIG. 1 is a diagram illustrating a system in which one embodiment of the invention can be practiced.

FIG. 1 is a diagram illustrating a computer system 100 in which one embodiment of the invention can be practiced.

The computer system 100 includes a processor 112, a memory 114, and a mass storage device 116. The computer system 100 receives a stream of input representing a vocabulary, processes the vocabulary in accordance to the method of the present invention, and outputs an object-oriented model usable with MOF and XMI.

The processor 112 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The memory 114 stores system code and data. The memory 114 is typically implemented with dynamic random access memory (DRAM) or static random access memory (SRAM). The system memory may include program code or code segments implementing one embodiment of the invention. The memory 114 includes a modeling tool 115 of the present invention when loaded from mass storage 116. The modeling tool 115 may also simulate the modeling functions described herein. The modeling tool 115 contains instructions that, when executed by the processor 112, cause the processor to perform the tasks or operations as described in the following.

The mass storage device 116 stores archive information such as code, programs, files, data, databases, applications, and operating systems. The mass storage device 116 may include compact disk (CD) ROM, a digital video/versatile disc (DVD), floppy drive, and hard drive, and any other magnetic or optic storage devices such as tape drive, tape library, redundant arrays of inexpensive disks (RAIDs), etc. The mass storage device 116 provides a mechanism to read machine-accessible media. The machine-accessible media may contain computer readable program code to perform tasks as described in the following.

Figure 2:
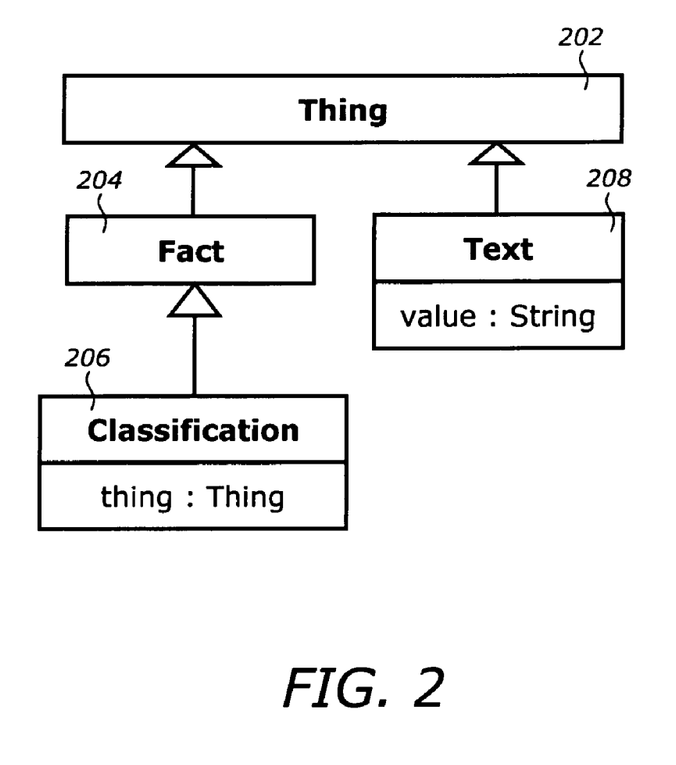
FIG. 2 illustrates the class model that is used as a base model by an object-oriented model generated by the method of the present invention.

FIG. 2 illustrates the class model that is used as a base model by an object-oriented model generated by the method of the present invention.

As shown in FIG. 2, the base model comprises a class 202 called "Thing" that is the superclass of the other classes. An instance of the class Thing 202 generally represents the subject or object of one or more facts. The class called "Fact" 204 is a subclass of the class Thing 202. Each instance of the class Fact 204 is a representation of a fact about one or more things. Subclasses of the class Fact 204 are generated to represent different types of facts corresponding to sentential forms in a vocabulary. The class Fact 204 is made to be a subclass of class Thing 202 so that the case where a fact is itself the subject or object of another fact can be represented using this base model.

The class called "Classification" 206 is a subclass of the class Fact 204. Each instance of the class Classification 206 represents a fact that a thing is classified as an instance of a particular concept. Subclasses of the class Classification 206 are generated for different concepts corresponding to different terms in a vocabulary. The attribute 206a of the class Classification 206 is used to refer to the thing being classified.

Figure 8:
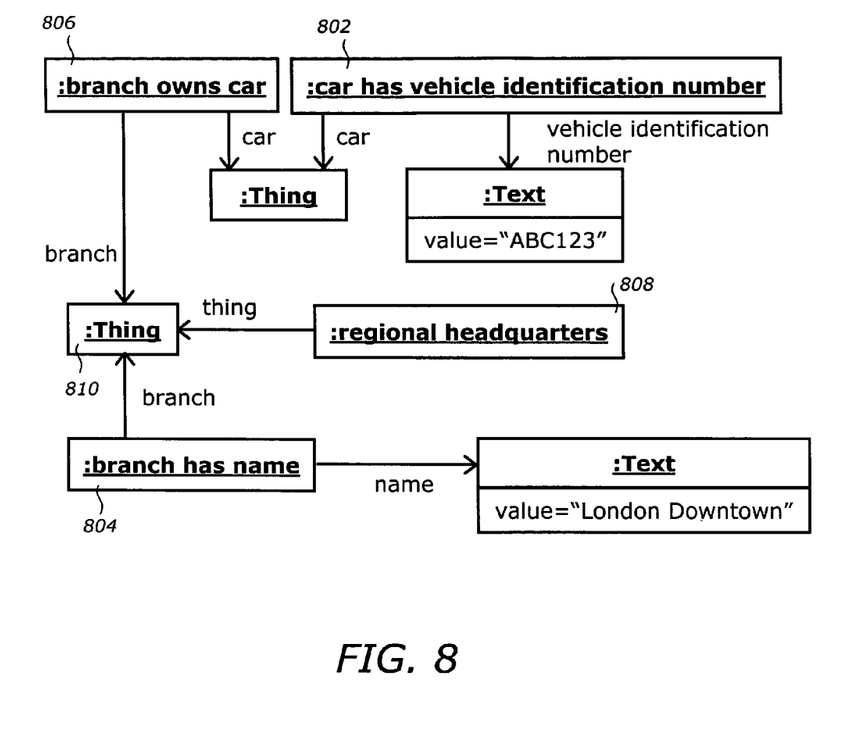
FIG. 8 illustrates the instance diagram of the generated classes that represent the above facts.

The class called "Text" 208 is a subclass of the class Thing 202. Instances of the class Text 208 are textual. In a typical set of facts, some facts relate nontextual things to textual things (such as names). Generally, everything referenced in a set of facts is related either directly or indirectly to some textual thing or things that serve to identify the thing being classified. The "Text" class is not directly used by the transformation process (process 400, FIG. 4) of the present invention, but is used to represent textual objects in communication of facts expressed in terms of the models generated according to the transformation process. Examples of instances of the class "Text" are shown in FIG. 8.

Figure 3:
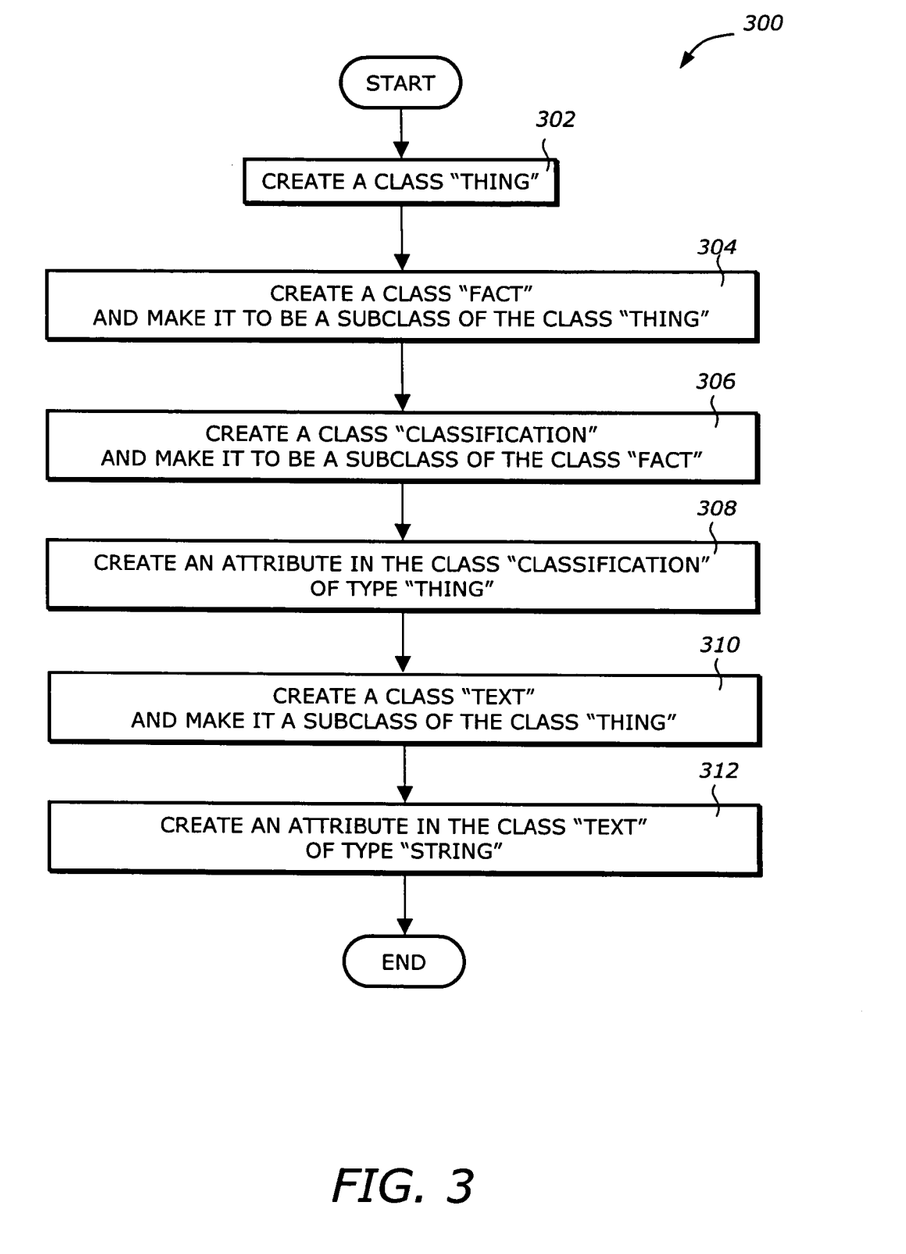
FIG. 3 is a flowchart illustrating the process of creating the base model shown in FIG. 2.

FIG. 3 is a flowchart illustrating the process of creating the base model shown in FIG. 2. Upon Start, process 300 creates a class Thing (block 302). Process creates a class Fact and makes it to be a subclass of the class Thing (block 304). Process 300 creates a class Classification and makes it to be a subclass of the class Fact (block 306). Process 300 creates an attribute in the class Classification of type "Thing" (block 308). Process 300 creates a class Text and makes it to be a subclass of the class Thing (block 310). Process 300 creates an attribute in the class Text of type "String" (block 312). Process 300 then terminates.

Figure 4:
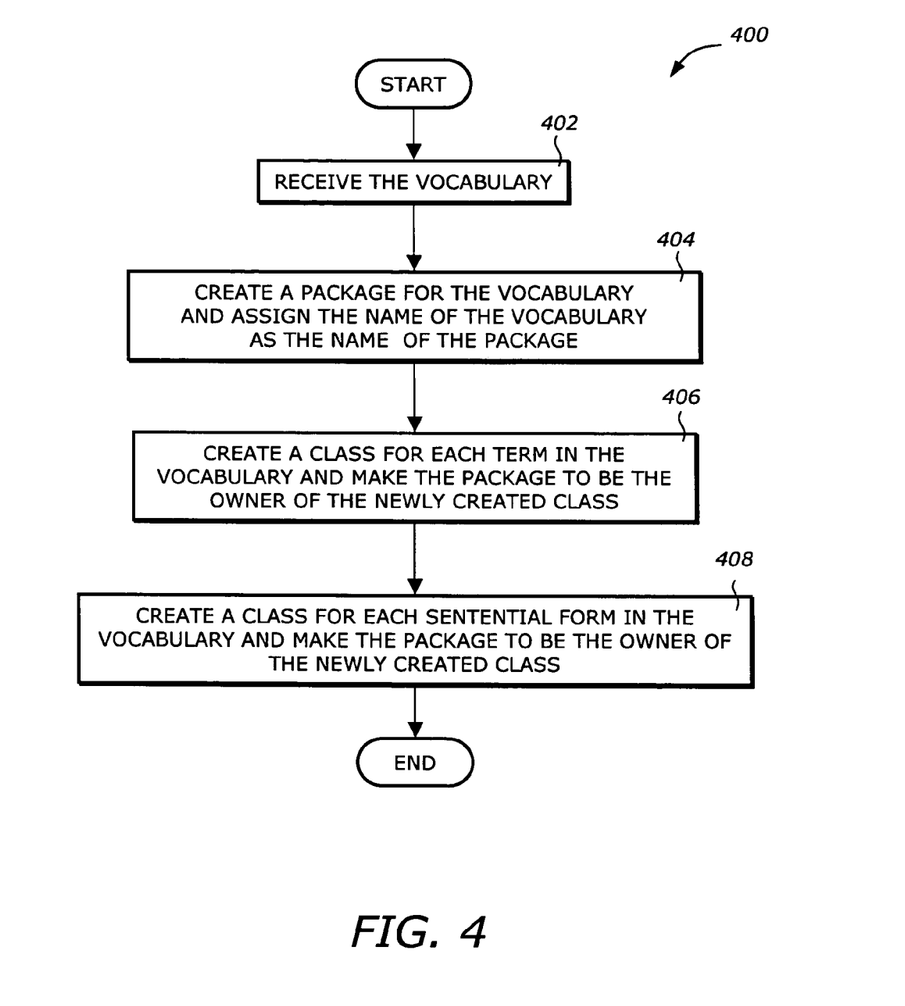
FIG. 4 is a flowchart illustrating the transformation process of a vocabulary that includes terms and sentential forms into a MOF-compliant class model.

FIG. 4 is a flowchart illustrating the transformation process of a vocabulary that includes terms and sentential forms into a MOF-compliant class model. The transformation process produces a UML package from a source vocabulary.

Upon Start, process 400 receives the vocabulary (block 402). The vocabulary comprises terms and sentential forms, each of the terms representing a concept, each of the sentential forms representing a fact type and including at least one placeholder, the placeholder being specified by a term. Process 400 creates a package for the vocabulary (block 404) and assigns the name of the vocabulary as the name of the package. Process 400 creates a class for each term in the vocabulary (block 406) and makes the target package to be the owner of the newly created class. Process 400 creates a class for each sentential form in the vocabulary (block 408) and makes the target package to be the owner of the newly created class. Process 400 then terminates.

Figure 5:
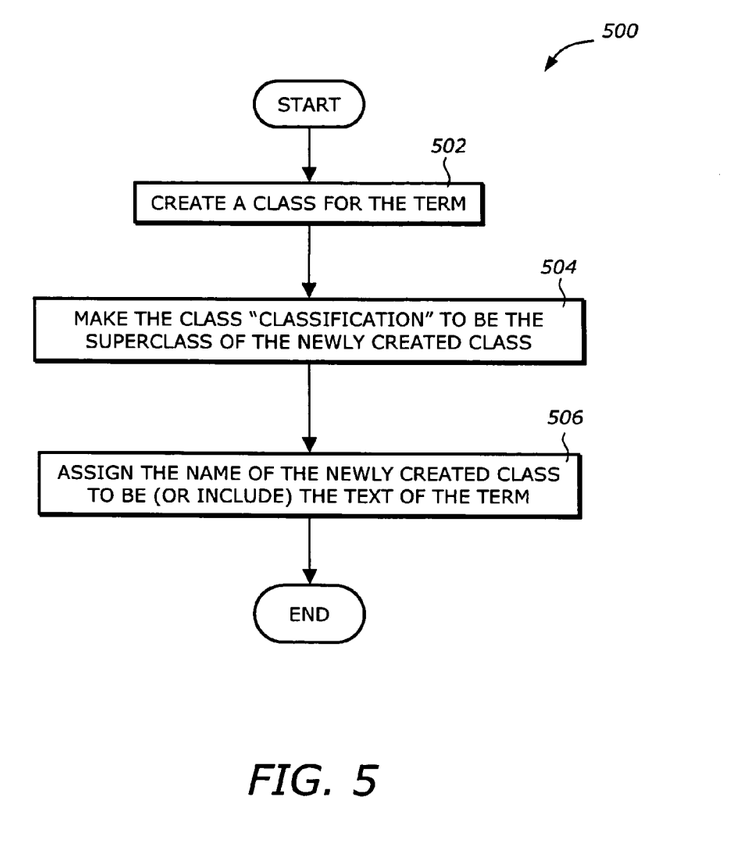
FIG. 5 is a flowchart illustrating an embodiment of the process executed by block 406 of FIG. 4.

FIG. 5 is a flowchart illustrating an embodiment of the process executed by block 406 of FIG. 4. Process 500 is executed for each term in the vocabulary. Upon Start, process 500 creates a class for the term (block 502). Each instance of the created class represents a fact that a thing is classified to be an instance of the concept represented by the corresponding term. Process 500 makes the class called "Classification" (in the base class model previously created by process 300) to be the superclass of the newly created class (block 504). Process 500 assigns the name of the newly created class to be (or include) the text of the term (block 506). Process 500 then terminates.

Figure 6:
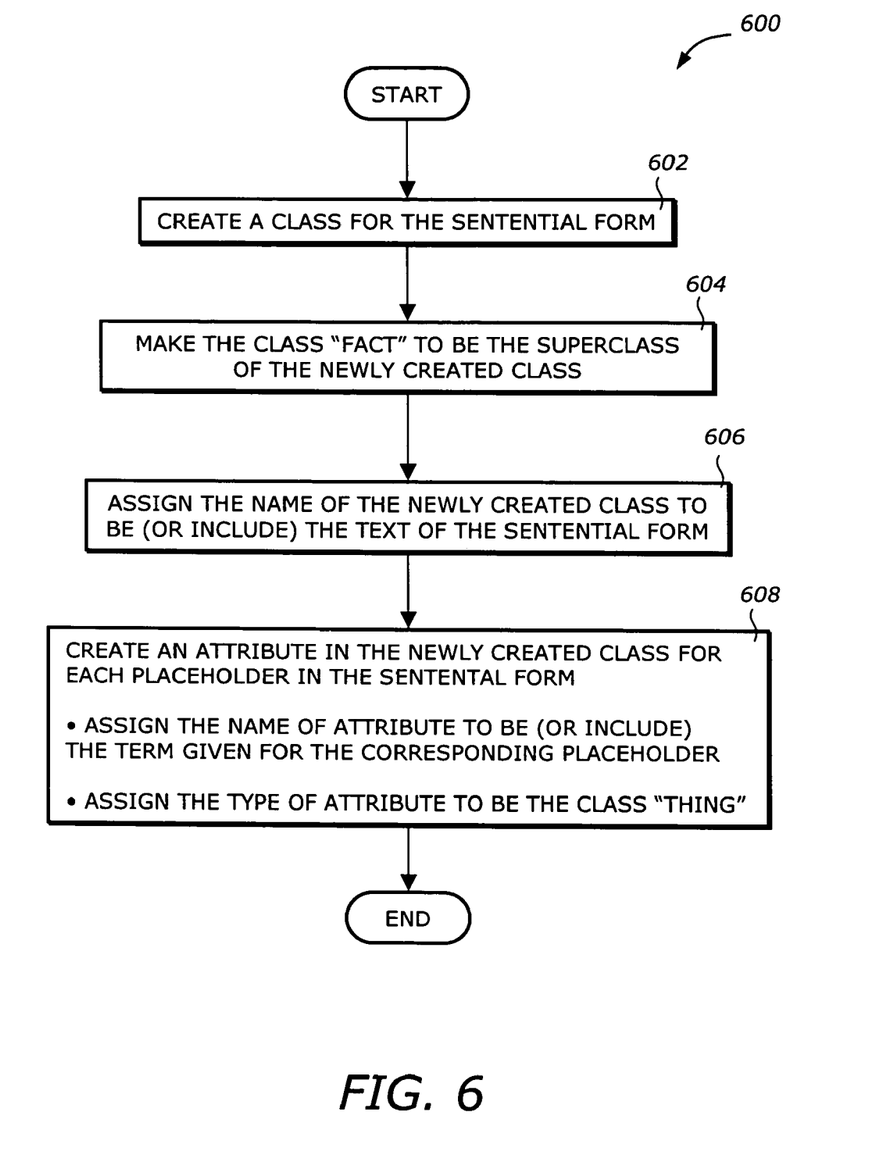
FIG. 6 is a flowchart illustrating an embodiment of the process executed by block 408 of FIG. 4.

FIG. 6 is a flowchart illustrating an embodiment of the process executed by block 408 of FIG. 4. Process 600 is executed for each sentential form in the vocabulary. Upon Start, process 600 creates a class for the sentential form (block 602). Each instance of the created class represents a fact that is an instance of the fact type represented by the corresponding sentential form. Process 600 makes the class called "Fact" (in the base class model previously created by process 300) to be the superclass of the newly created class (block 604). Process 600 assigns the name of the newly created class to be (or include) the text of the sentential form from the vocabulary (block 606). Process 600 creates an attribute in the newly created class for each placeholder of the sentential form (block 608). In creating the attribute, process 600 assigns the name of the attribute to be (or include) the term given for the corresponding placeholder and assigns the type of the attribute to be the class called "Thing" in the base class model created by process 300. Process 600 then terminates.

There are some variations that do not change the overall method of the present invention. One such variation is to remove the attribute "thing" from the class "Classification" 206 in the base model (created by process 300, FIG. 2) and instead generate an attribute of type Thing in each class created by process 500. The name of the generated attribute can be assigned to be the text of the corresponding term. Also the generation of names in general can vary.

In the following example, a simple vocabulary having terms and sentential forms is used to illustrate the method of the present invention. The vocabulary concerns cars in a car rental business.

Figure 7:
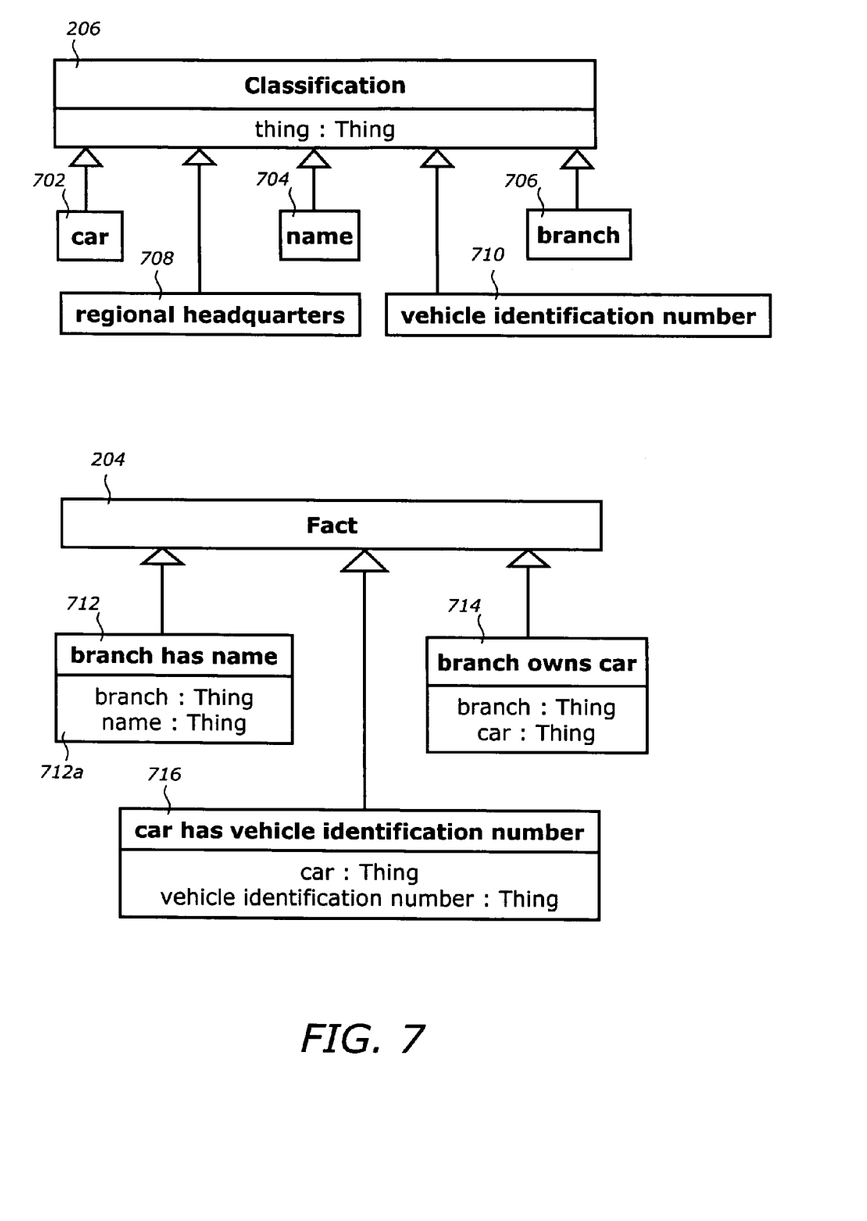
FIG. 7 shows the classes generated by the method of the present invention from the above vocabulary.

The terms and sentential forms included in this vocabulary are:
car
branch
vehicle identification number
name
car has vehicle identification number
branch has name
branch owns car
regional headquarters FIG. 7 shows the classes generated by the method of the present invention from the above vocabulary.

There is one generated class for each symbol in the vocabulary. The class for each term (702, 704, 706, 708, 710) is a subclass of the class Classification 206 of the base model shown in FIG. 2. The class for each sentential form (712, 714, 716) is a subclass of the class Fact 204 of the base model shown in FIG. 2 and has an attribute for each placeholder of the sentential form. For example, in class "branch has name" 712, there are two attributes 712a, one for the placeholder "branch" and one for the placeholder "name". Note that in this particular vocabulary, each sentential form has two placeholders (a subject and an object). In general, a sentential form in a vocabulary may have one or more placeholders.

The following facts are used to illustrate how the generated classes can be used.

A given car has the vehicle identification number "ABC123".

A given branch has the name "London Downtown".

The branch owns the car.

The branch is a regional headquarters.

FIG. 8 illustrates the instance diagram of the generated classes that represent the above facts. The instances are shown using UML notation. The colon and underline in each box indicate that this is an instance of the class and not the class itself. The instances of the generated classes are ":car has vehicle identification number" 802, ":branch has name" 804, ":branch owns car" 806, and ":regional headquarters" 808.

Each fact is represented by an instance of one of the generated classes. The subjects and objects of the facts are instances of the class Thing and the class Text. Where two facts are about the same thing, they refer to the same instance of the class Thing.

Note that the object of the class "regional headquarters" 808 does not represent a regional headquarters, but represents a fact that the thing 810 referred by its attribute represents a regional headquarters.

A novel feature of the present invention is that objects of classes generated for concepts (e.g., object of the class "regional headquarters" 808 in the above example) do not represent instances of the concepts, but rather represent facts of classification (e.g., a fact that a thing 810 referred by the attribute of the object 808 is classified to be a regional headquarters).

The generated class model can be used with the MOF to generate repositories for recording facts expressed using the source vocabulary, such as the facts used in the preceding example.

The generated class model can be easily translated into an XML Schema by following the XMI specification or by other means that are in common practice.

Elements of one embodiment of the invention may be implemented by hardware, firmware, software or any combination thereof. The term hardware generally refers to an element having a physical structure such as electronic, electromagnetic, optical, electro-optical, mechanical, electromechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, ROM, EROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine-readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, etc.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method for generating an object-oriented model from a vocabulary, the method comprising the operations of:

(a) receiving the vocabulary comprising terms and sentential forms, each of the terms comprising a word or phrase representing a concept, each of the sentential forms comprising a prepositional statement representing a fact type and including at least one placeholder, the placeholder being specified by a term;

(b) automatically creating a first class for each of the terms in the vocabulary;

(c) making a classification superclass to be a superclass for each of the first classes, wherein the classification superclass is a subclass of a fact superclass, wherein the fact superclass is a superclass whose instances are facts, such that each instance of the first class represents a fact that a thing is classified to be an instance of the concept represented by the corresponding term rather than representing an instance of the concept, and wherein the classification superclass is a superclass whose instances are classifications;

(d) automatically creating a second class for each sentential form in the vocabulary;

(e) making the fact superclass to be a superclass for each of the second classes, wherein the fact superclass is a superclass whose instances are facts, such that each instance of the second class represents a fact that is an instance of the fact type represented by the corresponding sentential form; and wherein acts (a)-(e) are performed so as to limit the granularity of encapsulation of information in each of the first classes and the second classes to no larger than the representation of a single fact.

2. The method of claim 1 further comprising:

(f) creating a package; and, (g) making each of the classes created in operations (b) and (d) to be a member of the package.

3. The method of claim 1 wherein operation (b) comprises: associating the first class with a name, the name including, as at least a portion of the name, the term for which the first class is created.

4. The method of claim 1 wherein operation (b) comprises:
creating an attribute in the first class, the value of the attribute in an instance of the first class representing a thing being classified.

5. The method of claim 1 wherein operation (d) comprises: associating each of the second classes with a name, the name including, as at least a portion of the name, the sentential form for which the second class is created.

6. The method of claim 2 wherein the vocabulary has a name and wherein the method further comprises:
associating the package with a name based on the name of the vocabulary.

7. The method of claim 1 further comprising:
creating a thing superclass whose instances are representations of things;
creating the fact superclass class whose instances are representations of facts;
making the fact superclass to be a subclass of the thing superclass;
creating the classification superclass whose instances are representations of classifications;
making the classification superclass to be a subclass of the fact superclass;
creating a text superclass whose instances are representations of texts; and
making the text superclass to be a subclass of the thing superclass.

8. The method of claim 1 wherein, for each placeholder of each sentential form in the vocabulary, operation (d) comprises the operation of:
creating an attribute for the placeholder within the class created for the corresponding sentential form.

9. The method of claim 8 wherein the operation of creating an attribute for the placeholder includes the operation of:
assigning a name to the attribute using the text of the term specified for the placeholder.

10. The method of claim 8 wherein the operation of creating an attribute for the placeholder further includes the operation of:
setting the type of the attribute to be a general type representing a thing, the thing being the subject of facts expressed by the vocabulary.

11. An article of manufacture comprising:
a machine-accessible medium including data that, when accessed by a machine, causes the machine to perform operations comprising:
(a) receiving a vocabulary comprising terms and sentential forms, each of the terms comprising a word or phrase representing a concept, each of the sentential forms comprising a prepositional statement representing a fact type and including at least one placeholder, the placeholder being specified by a term;
(b) automatically creating a first class for each of the terms in the vocabulary;
(c) making a classification superclass to be a superclass for each of the first classes, wherein the classification superclass is a subclass of a fact superclass, such that each instance of the first class represents a fact that a thing is classified to be an instance of the concept represented by the corresponding term rather than representing an instance of the concept, and wherein the classification superclass is a superclass whose instances are classifications;
(d) automatically creating a second class for each sentential form in the vocabulary;
(e) making the fact superclass to be a superclass for each of the second classes, wherein the fact superclass is a superclass whose instances are facts, such that each instance of the second class represents a fact that is an instance of the fact type represented by the corresponding sentential form; and
wherein acts (a)-(e) are performed such that the granularity of encapsulation of information in each of the first classes and the second classes is no larger than the representation of a single fact.

12. The article of manufacture of claim 11 wherein the data further comprise data that, when accessed by the machine, cause the machine to perform operations comprising:
(f) creating a package; and,
(g) making each of the classes created in operations (b) and (d) to be a member of the package.

13. The article of manufacture of claim 11 wherein the data causing the machine to perform the operation (b) comprise data that, when accessed by the machine, cause the machine to perform operations comprising:
associating the first class with a name, the name including, as at least a portion of the name, the term for which the first class is created.

14. The article of manufacture of claim 11 wherein the data causing the machine to perform the operation (b) comprise data that, when accessed by the machine, cause the machine to perform operations comprising:
creating an attribute in the first class, the value of the attribute in an instance of the first class representing a thing being classified.

15. The article of manufacture of claim 11 wherein the data causing the machine to perform the operation (d) comprise data that, when accessed by the machine, cause the machine to perform operations comprising:
associating each of the second classes with a name, the name including, as at least a portion of the name, the sentential form for which the second class is created.

16. The article of manufacture of claim 12 wherein the vocabulary has a name and wherein the data further comprise data that, when accessed by the machine, cause the machine to perform operations comprising:
associating the package with a name based on the name of the vocabulary.

17. The article of manufacture of claim 11 wherein the data further comprise data that, when accessed by the machine, cause the machine to perform operations comprising:
creating a thing superclass whose instances are representations of things;
creating a the fact superclass whose instances are representations of facts;
making the fact superclass to be a subclass of the thing superclass;
creating the classification superclass whose instances are representations of classifications;
making the classification superclass to be a subclass of the fact superclass;
creating a text superclass whose instances are representations of texts; and
making the text superclass to be a subclass of the first general class.

18. The article of manufacture of claim 11 wherein the data causing the machine to perform the operation (c) comprise data that, when accessed by the machine, cause the machine to perform operations comprising:
for each placeholder of each sentential form in the vocabulary, creating an attribute for the placeholder within the class created for the corresponding sentential form.

19. The article of manufacture of claim 18 wherein the data causing the machine to perform the operation of creating an attribute for the placeholder comprise data that, when accessed by the machine, cause the machine to perform operations comprising:

assigning a name to the attribute using the text of the term specified for the placeholder.

20. The article of manufacture of claim 18 wherein the data causing the machine to perform the operation of creating an attribute for the placeholder further comprise data that, when accessed by the machine, cause the machine to perform operations comprising:

setting the type of the attribute to be a general type representing a thing, the thing being the subject of facts expressed by the vocabulary.

21. A system comprising:

a processor; and a memory coupled to the processor, the memory containing instructions that, when executed by the processor, cause the processor to:

(a) receive a vocabulary comprising terms and sentential forms, each of the terms comprising a word or phrase representing a concept, each of the sentential forms comprising a prepositional statement representing a fact type and including at least one placeholder, the placeholder being specified by a term;

(b) automatically create a first class for each of the terms in the vocabulary;

(c) cause a classification superclass to be a superclass for each of the first classes, wherein the classification superclass is a subclass of a fact superclass, such that each instance of the first class represents a fact that a thing is classified to be an instance of the concept represented by the corresponding term rather than representing an instance of the concept, and wherein the classification superclass is a superclass whose instances are classifications;

(d) automatically create a second class for each sentential form in the vocabulary;

(e) cause the fact superclass to be a superclass for each of the second classes, wherein the fact superclass is a superclass whose instances are facts, such that each instance of the second class represents a fact that is an instance of the fact type represented by the corresponding sentential form; and wherein acts (a)-(e) are performed such that the granularity of encapsulation of information in each of the first classes and the second classes is no larger than the representation of a single fact.

22. The system of claim 21 wherein the instructions further comprise instructions that, when executed by the processor, cause the processor to:

(e) create a package; and, (f) make each of the classes created in (b) and (d) to be a member of the package.

23. The system of claim 21 wherein the instructions causing the processor to create a first class for each of the terms in the vocabulary comprise instructions that, when executed by the processor, cause the processor to:

associate each of the first classes with a name, the name including, as at least a portion of the name, the term for which the first class is created.

24. The system of claim 21 wherein the instructions causing the processor to create a first class for each of the terms in the vocabulary comprise instructions that, when executed by the processor, cause the processor to:

create an attribute in the first class, the value of the attribute in an instance of the first class representing a thing being classified.

25. The system of claim 21 wherein the instructions causing the processor to create a second class for each sentential form in the vocabulary comprise instructions that, when executed by the processor, cause the processor to:

associate the second class with a name, the name including, as at least a portion of the name, the sentential form for which the second class is created.

26. The system of claim 22 wherein the vocabulary has a name and wherein the instructions further comprise instructions that, when executed by the processor, cause the processor to:

associate the package with a name based on the name of the vocabulary.

27. The system of claim 21 wherein the instructions further comprise instructions that, when executed by the processor, cause the processor to:

create a thing superclass whose instances are representations of things;

create the fact superclass whose instances are representations of facts;

make fact superclass to be a subclass of the thing superclass;

create the classification superclass whose instances are representations of classifications;

make the classification superclass to be a subclass of the fact superclass;

create a text superclass whose instances are representations of texts; and make text superclass to be a subclass of the thing superclass.

28. The system of claim 21 wherein the instructions causing the processor to create a second class for each of the sentential forms in the vocabulary comprise instructions that, when executed by the processor, cause the processor to:

for each placeholder of each sentential form in the vocabulary, create an attribute for the placeholder within the class created for the corresponding sentential form.

29. The system of claim 28 wherein the instructions causing the processor to create an attribute for the placeholder comprise instructions that, when executed by the processor, cause the processor to:

assign a name to the attribute using the text of the term specified for the placeholder.

30. The system of claim 28 wherein the instructions causing the processor to create an attribute for the placeholder further comprise instructions that, when executed by the processor, cause the processor to:

set the type of the attribute to be a general type representing a thing, the thing being the subject of facts expressed by the vocabulary.

* * * * *